United States Patent [19]

Hardinger, Jr.

[11] Patent Number: 5,413,215
[45] Date of Patent: May 9, 1995

[54] HOUSING SYSTEM FOR STORING DISK CONTAINERS

[75] Inventor: Charles A. Hardinger, Jr., 1260 N. Prospect #306, Milwaukee, Wis. 53202

[73] Assignee: Charles A. Hardinger, Jr., Milwaukee, Wis.

[21] Appl. No.: 245,344

[22] Filed: May 18, 1994

[51] Int. Cl.$^6$ .............................................. B65D 85/57
[52] U.S. Cl. .............................. 206/308.1; 206/308.3; 206/806
[58] Field of Search .................... 206/232, 307–313, 206/387, 444, 472, 456, 806, 308.1, 308.3

[56] References Cited

U.S. PATENT DOCUMENTS

| | | | |
|---|---|---|---|
| D. 307,076 | 4/1990 | Ozeki . | |
| D. 307,667 | 5/1990 | Ozeki . | |
| 4,502,596 | 3/1985 | Saetre et al. | 206/444 |
| 4,518,275 | 5/1985 | Rauch, III et al. | 206/387 |
| 4,635,797 | 1/1987 | Bankier | 206/312 |
| 4,664,258 | 5/1987 | Eichner . | |
| 4,771,890 | 9/1988 | Hofland et al. | 206/806 |
| 4,793,477 | 12/1988 | Manning et al. . | |
| 4,850,731 | 7/1989 | Youngs . | |
| 4,869,364 | 9/1989 | Bray | 206/232 |
| 4,892,189 | 1/1990 | Kunimune et al. | 206/232 |
| 5,129,516 | 7/1992 | Theros . | |
| 5,199,743 | 4/1993 | Rosinski . | |
| 5,207,717 | 5/1993 | Manning | 206/444 |
| 5,224,599 | 7/1993 | Uchida | 206/444 |
| 5,290,118 | 3/1994 | Ozeki . | |
| 5,295,577 | 3/1994 | Minter . | |
| 5,341,926 | 8/1994 | Leben | 206/387 |
| 5,358,113 | 10/1994 | Hellenbrand | 206/411 |

FOREIGN PATENT DOCUMENTS

| | | | |
|---|---|---|---|
| 1207386 | 8/1959 | France | 206/309 |
| 5085584 | 4/1993 | Japan | 206/444 |

OTHER PUBLICATIONS

U.S. Ser. No. 08/120,693 to R. G. Hellenbrand (Drawings).
P. 246 of Siekert Baum 1994 Office Products Catalog (admitted prior art).
Pp. 31–34 of Dartek 1993 Fall Catalog, admitted prior art.
Joshua Mier "Diskette Pages" flier, undated, admitted prior art.

*Primary Examiner*—Jimmy G. Foster
*Attorney, Agent, or Firm*—Quarles & Brady

[57] ABSTRACT

A housing system for storing a disk container is disclosed. Two panels are connected by a hinge web so as to form a clamshell type housing. Hooks are removably connectable to a panel so that the system can be converted from a housing usable with ring binder type notebooks to a system usable in upright file cabinet storage. There is also provided tabs and holes for retaining the disk containers in place and assisting in their removal, a label holder, a display window suitable for displaying identifying information for the disk, and a rectangular well suitable for receiving documentation for the disk opposite the recess.

10 Claims, 2 Drawing Sheets

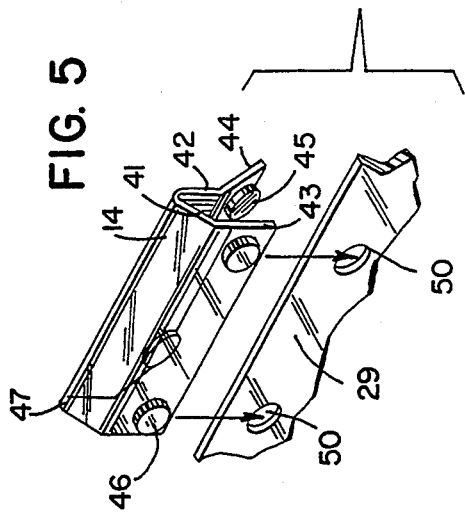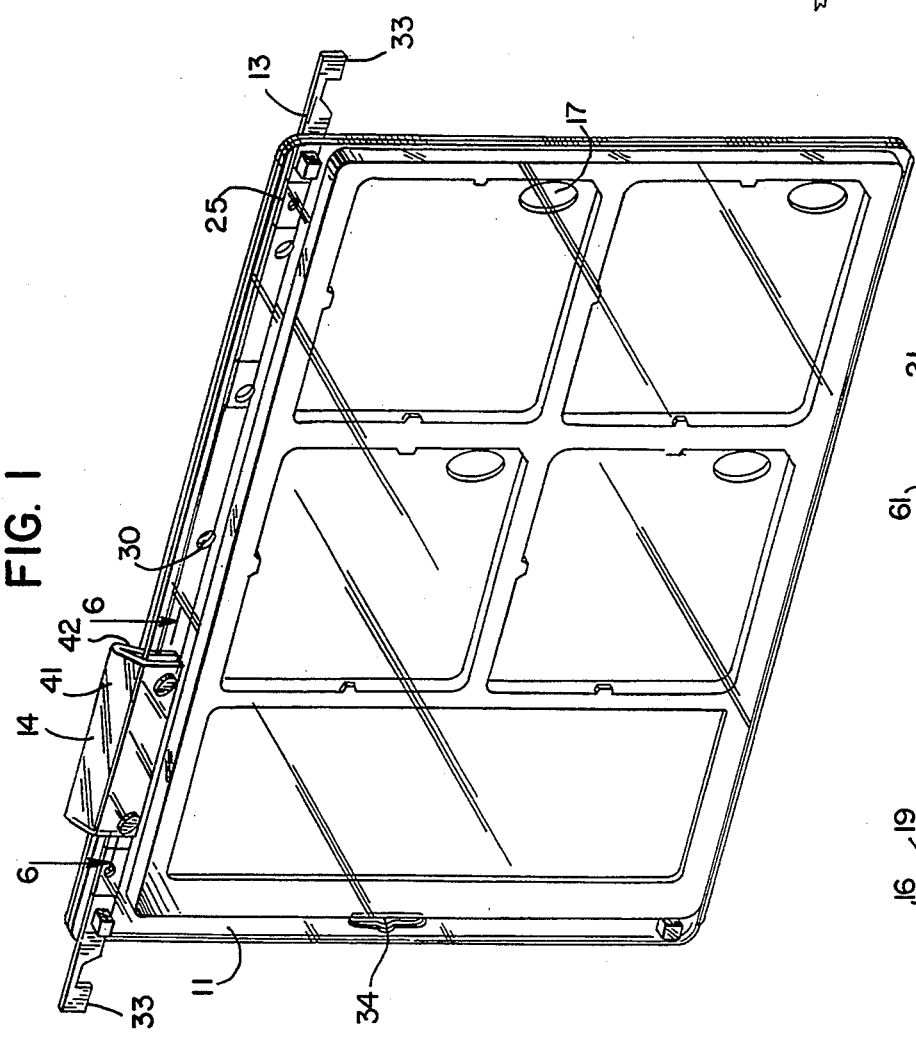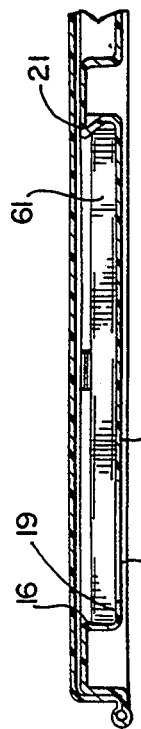

HOUSING SYSTEM FOR STORING DISK CONTAINERS

BACKGROUND OF THE INVENTION

1. Field of the Invention

The present invention relates to housing systems useful for storing disk containers. It appears especially well suited for use in storing computer diskettes and compact disk containers.

2. Background of the Art

In recent years data storage media has been reduced in size. For example, "LP" albums have been replaced with CD's and large spools of computer tape have been replaced with compact diskettes.

Discs and diskettes (collectively "disks") are often housed in rectangular containers, and these in turn are stored in specialized drawers, shelves, or mounting sleeves. Unfortunately, conventional storage systems often expose the containers to the elements. More importantly, they do not provide the opportunity to store the housings in standard upright file cabinets. As a result, conventional diskette systems are often stored on desk tops, unnecessarily occupying valuable work space.

Moreover, there is often a desire to store with a disk documentation, album notes, and/or other information associated with the disk. However, conventional storage systems often do not provide the opportunity to closely associate the documentation with the diskette during storage. Apart from the loss of convenience, this can lead to misplaced documentation.

Also, prior disk container storage systems are usually not designed to permit transportation of multiple diskettes together in sub-groupings (apart from the main storage container). Further, some prior systems do not provide a means of readily associating an identifier (e.g. a label) with a diskette.

Thus, it can be seen that a need exists for an improved system for housing disk containers.

SUMMARY OF THE INVENTION

An improved housing system for disk containers is provided. The present invention provides a first panel having a recess formed in the top surface thereof for retaining a disk container. There is a hinge web running along (and linked to) a first lateral end of the first panel, the first panel also having a second lateral end opposite the first end.

There is also a second panel linked to the hinge web so that the hinge web also runs along a first lateral end of the second panel with the second panel also having a second lateral end opposite the first lateral end of the second panel. A hook extends from the first panel or second panel adjacent a second lateral end.

Connector means are provided on the first and second panels so that when the top surfaces of the panels are folded against each other at the hinge web the panels can be removably linked together via the connector means so as to be retained in a folded, closed position. In this way, the second panel top surface and the first panel recess can form a storage area suitable to retain the disk container.

In an especially preferred form, two hooks are linked together on a bar, and the bar is removably threaded to the second lateral end of the first panel by a loop on the first panel. Also, the second lateral end of the first panel has three holes that are suitable for receiving a three ring binder's set of rings.

There can also be provided a label holder that is configured so as to be linked to the second lateral end of the first or second panel via at least one hole in the second panel. The label holder is preferably retained on the panel by a snap fit or wedge connection through a plurality of holes on the panel.

In another aspect, the connector is a crevice on one panel and a projection on the other. The crevice and projection form a snap fit or wedge connector.

In yet another aspect, the recess can have a tab suitable for removably retaining the disk container when it is in the recess and a through hole for assisting in the removal of the disk container from the recess.

If desired, there can be a plurality of such recesses for multiple disk containers, and the second panel can have a rectangular well suitable for receiving documentation for the disk containers. Also, the first panel can contain a display window suitable for displaying an identifier label for a disk.

The present invention provides a compact system for storing one or more disk containers. Uniquely, the system permits storage in standard upright file cabinets designed to receive vertically hanging folders having top hooks on side rails, and is readily convertible to a storage system for use in a three ring binder, or use on a peg display by itself.

The system minimizes access by dust or other environmental problems, and provides a means of associating identifiers and documentation in close association with the disk containers. Using the invention, one can readily determine the contents of the storage system without opening the housing.

The objects of the invention therefore include providing:

(a) an improved system of the above kind for storing computer diskettes, compact disk containers, and the like;

(b) a system of the above kind for storing identifier information and documentation with diskettes;

(c) a system of the above kind that can be used either in standard upright file cabinets or in three ring binders; and (d) a system of the above kind which can be readily and inexpensively manufactured.

These and still other objects and advantages of the present invention will be discussed below with reference to the preferred embodiments of the invention. The following description contains examples of the invention. However, they are not exhaustive of all forms of the invention. Therefore, reference should be made to the claims which follow the description for determining the full scope of the invention.

BRIEF DESCRIPTION OF THE DRAWINGS

FIG. 1 is a perspective view of the closed housing of the present invention, positioned so as to be ready to be placed in a file drawer;

FIG. 2 is a top plan view of the opened housing, with label holder and hook bars removed and with diskettes and a label partially shown;

FIG. 3 is an enlarged sectional view taken on line 3—3 of FIG. 2;

FIG. 4 is an enlarged view, partially in section, on line 4—4 of FIG. 2 after the housing has been closed, and with a diskette inserted in the recess;

FIG. 5 is an enlarged exploded perspective view of the label holder aspect of the invention; and FIG. 6 is an enlarged sectional view taken on line 6—6 of FIG. 1.

DETAILED DESCRIPTION OF THE PREFERRED EMBODIMENTS

Figures 2, 3:
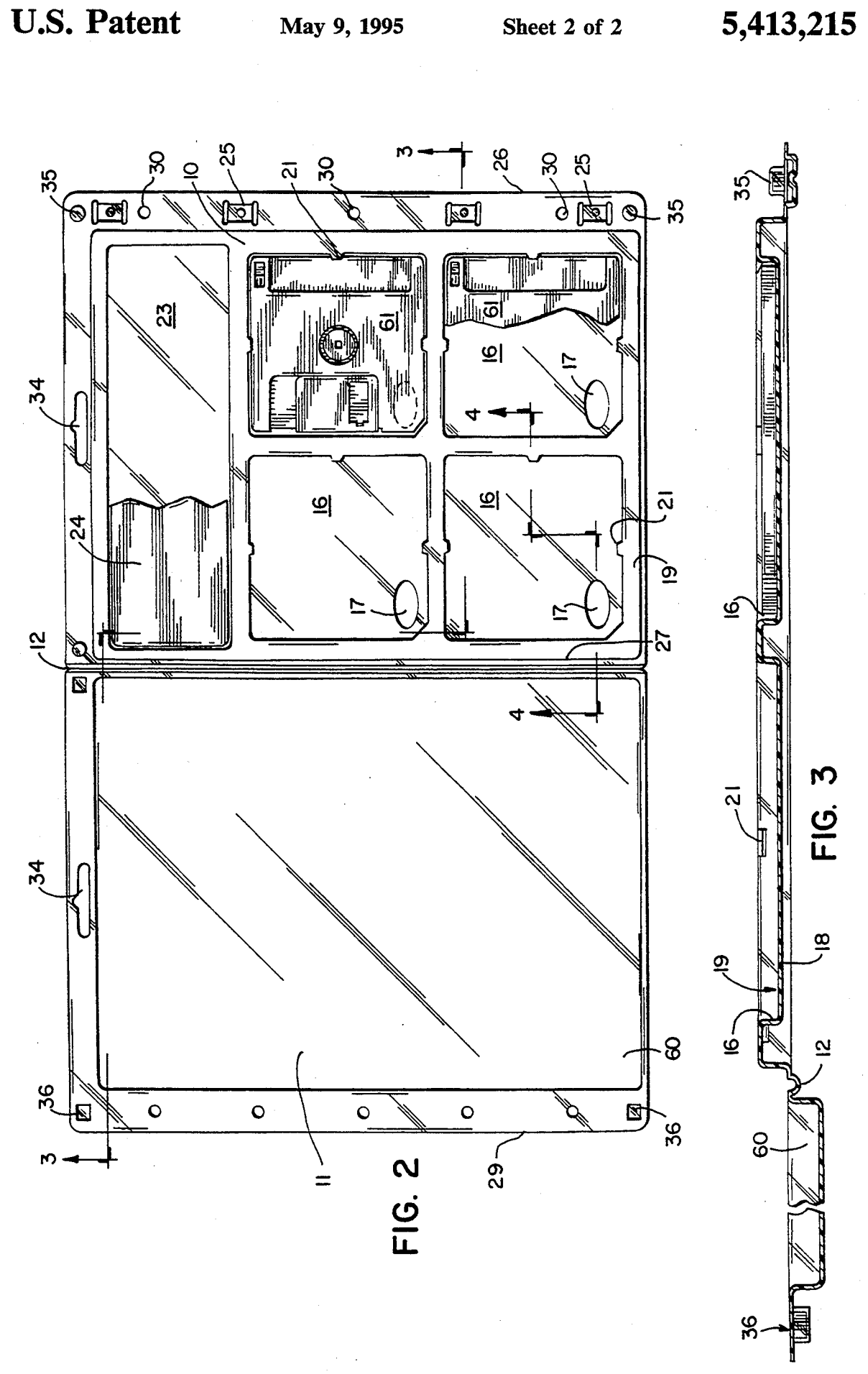

As best seen in FIG. 2, there is a first panel 10, a second panel 11, and a hinge web 12 linking the first and second panels. FIG. 1 shows a hook bar 13 and a label holder 14 used with the panels. While the preferred bar 13 has two 90° end bends, the end of the bar need not always be bent. They may instead be straight bar type "hooks" that merely extend over the rails.

As best seen in FIGS. 2-4, the first panel 10 has a plurality of recesses 16. These recesses are depressions integrally formed in the first panel and closely follow the shape of the container to be stored, with a slight clearance. The recesses in the drawings are shown as being generally square with a clipped corner (much like a conventional computer diskette would be).

The recesses have through holes 17 which permit the diskettes to be pushed out of their pockets by a finger from the bottom side 18 of the first panel (see FIG. 1) upward away from the top side 19 of the first panel. Extending into each recess are tabs 21. As best seen in FIG. 4, these tabs are sloped so as to permit the edges of the disk containers to snap under them and thus be removably retained in the recess.

As seen in FIG. 2, there is also a display window 23 upon which a label 24 can be positioned so as to provide information about the disks. The label preferably faces downward so as to be visible through the window when the housing is closed.

The first panel has a series of belt loop type structures 25 (see FIG. 2) positioned at a second lateral end 26 of the first panel that is opposite to a first lateral end 27. These loops could instead be positioned at a second lateral 29 of the second panel 11. If desired, the loop could be a single loop running the entire end.

On the first panel are through holes 30 which correspond with positions of standard three ring binder rings. These holes could instead be positioned at lateral end 29 of the second panel.

As shown in FIG. 1, the bar 13 can be slid through the threads 25 such that hooks 33 extend transversely from the panel 10. When in this position, they are suitable for use with a standard upright file cabinet having side rails. When the bar is removed, holes 30 are exposed and a three ring binder system can be used.

Openings 34 are also provided. These permit such housings to be hung on a store rack or otherwise be stored on one or more pegs in the open or closed positions.

All but bar 13 are preferably formed of vacuum formed PVC anti-static plastic. The bar is preferably made of a metal.

Connector projections 35 (FIG. 3) are provided on the first panel. These interfit with second panel crevices 36. The projections are cylindrical and the crevices are cubical so as to create wedge connectors. When the container is folded along the hinge web 12, the projections 35 removably wedge into the crevices 36 to retain the system in closed position.

FIGS. 1 and 5 show label holder 14. It has a first transparent wall 41 and a second transparent wall 42, with a fold web 47 therebetween. There are also jaws 43 and 44 which can be folded towards each other so as to bite through the edge 29 of the second panel (with projections 45 extending through holes 50 on the second panel and into crevices 46). This can be another wedge connection like that of 35, 36, or a snap fit connection using tabs like tab 21. A two sided label (which is substantially the shape of wall 42 and not shown) can be inserted between walls 41 and 42 so as to be visible in both directions when the label holder is mounted as shown in FIG. 1.

As shown in FIG. 2 and FIG. 3, the second panel is formed with a rectangular well 60 which is preferably slightly larger than the area of an $8\frac{1}{2}" \times 11"$ piece of paper. It is suitable for retaining documentation relevant to the diskettes. If desired, tabs like those used at 21 can also be provided around the edge of the recess 60. However, this is not shown in the embodiment depicted.

While the preferred embodiment has recesses suitable for receiving four computer diskettes 61, the number of recesses can be changed. It is preferred that there be one to twelve recesses.

It will be appreciated that the present invention provides a folder type housing constructed of a rigid, preferably transparent material for receiving and storing at least one, and preferably a plurality of disk containers. The containers are held in place by gripping bumpers 21 which permit them to be removed via a push through a rear finger hole 17.

A raised area 23 is provided on the folder for placement of a label or sticker to facilitate discovery of the contents of the folder and a cavity 60 is provided to receive and store documents which contain information pertinent to the contents of the diskettes.

The folder is preferably constructed of a clear material to allow visual examination of the documents and label from the outside, but could be (for confidentiality purposes) created out of a non-transparent material.

I claim:

1. A housing system for storing a disk container, the system comprising:

a first panel having a recess formed in a top surface thereof for retaining the disk container;

a hinge web running along and linked to a first lateral end of the first panel, the first panel also having a second lateral end opposite the first lateral end;

a second panel linked to the hinge web so that the hinge web runs along a first lateral end of the second panel, the second panel also having a second lateral end opposite the first lateral end of the second panel;

a hook extending from the first or the second panel adjacent the second lateral end of the panel from which the hook extends; and connector means on the first and second panels such that when top surfaces of both panels are folded against each other at the hinge web, the panels can removably be linked together via the connector means to be retained in a folded and closed position such that the second panel top surface and the first panel recess will then form a storage area suitable to retain the disk container.

2. The system of claim 1, wherein there are two such hooks, they are linked together on a bar, and the bar can be removably threaded to the second lateral end of the first or the second panel through a loop on that panel.

3. The system of claim 2, wherein the second lateral end of at least one of the first or the second panel has holes suitable for receiving notebook binder rings.

4. The system of claim 1, further comprising a label holder that is configured so as to be suitable to be linked to the second lateral end of the first or the second panel through at least one hole in the panel to which the label holder is to be linked.

5. The system of claim 4, wherein the label holder can be retained on the first or the second panel by a connection through a plurality of holes on the panel to which the label holder is to be linked.

6. The system of claim 1, wherein the connector means is a crevice on one panel and a projection on the other panel, the crevice and projection forming a connector.

7. The system of claim 1, wherein the recess has a tab suitable for removably retaining the disk container when it is in the recess, and a through hole for assisting in the removal of the disk container from the recess when the disk container is in the recess and the panels are not in a closed position.

8. The system of claim 1, wherein the first panel has a plurality of such recesses.

9. The system of claim 1, wherein the second panel also has a rectangular well suitable for receiving documentation for the disk container.

10. The system of claim 9, wherein the first panel also has a display window suitable for displaying an identification label.

* * * * *